United States Patent
Skorupa

(10) Patent No.: US 8,888,064 B2
(45) Date of Patent: Nov. 18, 2014

(54) COIL RETAINER AND METHOD OF USE

(75) Inventor: Jerry Skorupa, Highland, IN (US)

(73) Assignee: Jerry Skorupa, Highland, IN (US)

( * ) Notice: Subject to any disclaimer, the term of this patent is extended or adjusted under 35 U.S.C. 154(b) by 0 days.

(21) Appl. No.: 13/484,011

(22) Filed: May 30, 2012

(65) Prior Publication Data

US 2013/0320172 A1    Dec. 5, 2013

(51) Int. Cl.
| | | |
|---|---|---|
| *B65D 63/00* | (2006.01) | |
| *A47B 97/00* | (2006.01) | |
| *F16M 1/00* | (2006.01) | |
| *F16M 3/00* | (2006.01) | |
| *F16M 5/00* | (2006.01) | |
| *F16M 7/00* | (2006.01) | |
| *F16M 9/00* | (2006.01) | |
| *F16M 11/00* | (2006.01) | |

(52) U.S. Cl.
USPC ........ 248/499; 248/500; 248/680; 248/309.1; 410/47; 410/48; 410/98

(58) Field of Classification Search
CPC ........ A47F 7/071; F16M 13/02; A47G 29/08; B61D 45/003; B60P 7/08; B60P 7/12; B60P 7/00; B23P 17/04
USPC ................. 248/671, 680, 681, 500, 499, 505, 248/309.1; 224/42.12, 42.13, 42.18; 269/130, 131; 29/281.1; 156/523, 527, 156/577; D19/69, 70, 36, 68; 410/48
See application file for complete search history.

(56) References Cited

U.S. PATENT DOCUMENTS

| | | | | |
|---|---|---|---|---|
| 2,772,064 A | * | 11/1956 | Cole ............... | 410/47 |
| 3,154,026 A | * | 10/1964 | Klasing, Jr. ............ | 410/41 |
| 3,637,234 A | * | 1/1972 | Thomas et al. ........... | 410/50 |
| 3,875,617 A | * | 4/1975 | Cline ................ | 410/47 |
| 4,008,669 A | * | 2/1977 | Sumrell ............... | 410/47 |
| 4,204,479 A | * | 5/1980 | Rosa .................. | 206/397 |
| 4,487,537 A | * | 12/1984 | Morse ............... | 410/47 |
| 4,513,864 A | * | 4/1985 | Liebel ............. | 206/396 |
| 4,526,500 A | * | 7/1985 | Patrick .............. | 410/48 |
| 5,076,745 A | * | 12/1991 | Klein ............... | 410/94 |
| 5,137,405 A | * | 8/1992 | Klein ............... | 410/94 |
| 5,330,148 A | * | 7/1994 | Floyd .............. | 248/499 |
| 5,538,376 A | * | 7/1996 | Borda ............. | 410/99 |
| 5,944,349 A | * | 8/1999 | Bowling ............. | 280/789 |
| 6,971,826 B2 | * | 12/2005 | Valentine ............. | 410/50 |
| 7,270,507 B1 | * | 9/2007 | Jernigan .............. | 410/50 |
| 7,726,090 B2 | * | 6/2010 | Verelli et al. .......... | 52/649.8 |
| 2012/0128441 A1 | * | 5/2012 | McDaniel ............ | 410/47 |

* cited by examiner

*Primary Examiner* — Jonathan Liu
*Assistant Examiner* — Muhammad Ijaz
(74) *Attorney, Agent, or Firm* — Leydig, Voit & Mayer, Ltd.

(57) ABSTRACT

A coil retainer is configured for securing a metal coil to a support surface using tension lines. The coil retainer includes a core insert extending about an arc and configured to be inserted into a hollow core of the metal coil so that an exterior of the core insert supports an inner surface of the coil along a portion of the inner surface. A coil side containment wall extends along the arc of the core insert and projects radially outward from the core insert. The coil side containment wall is configured to support a flat side of the metal coil. A cross beam extends across the arc of the core insert. Attached to the cross beam is at least one chain guide configured to guide a tension line over the cross beam and at least one chain mount configured to secure a tension line to the coil retainer.

19 Claims, 4 Drawing Sheets

COIL RETAINER AND METHOD OF USE

FIELD

The invention relates to a device for securing metal coils to a support surface, and particularly relates to a coil retainer that is at least partially inserted into a hollow core of the metal coil.

BACKGROUND

Metal coils typically have diameters ranging anywhere from 50 to 80 inches and widths that can be from 42 to 66 inches. As a result, these coils can weight anywhere from 20,000 to over 50,000 pounds. The coils are round and, thus, have a propensity to roll. Additionally, the coils are tall relative to their width, which makes them pone to tipping sideways. This combination of large mass, ease of tipping over, and high capacity for rolling presents challenges during transport of metal coils. Due to the inherent challenges in transporting metal coils, care is always taken to ensure that the coils are securely fastened to the surface on which they are being transported such as a truck bed. Coils are typically held down with simple chains, and even with the greatest prudence, it can be very difficult to entirely prevent the coil from moving during transport. Due to the large mass of the coils, even the smallest amount of movement can yield significant momentum. This momentum inevitably results in an upward force on the chain holding the coil down to the truck bed, for example, as a rolling or tipping motion of the coil tends to pull the chain upward. However, due the shallow angle at which most chains are positioned as they pass over the lower portion of the metal coil, the upward force caused by the moving coil translates into a tensile force along the length of the angled chain that is proportional to the coil mass.

Another disadvantage of the typical configuration used to hold metal coils on the support surface, where chains directly pass over the metal coil, is that the chains can damage several material layers of the coil at the position where the chains are in direct contact with the coil. As the transport vehicle moves, the force exerted on the chains can cause the chains to form indentations in the metal coils, thus damaging a few layers of the coils, which, due the high cost of these coils, is disadvantageous. Moreover, the indentations formed in the coil create a space into which the chain can move relative to the coil and relax its tension, which may also allow more freedom for the coil to move relative to the truck, which is generally an undesirable occurrence.

SUMMARY

In an embodiment, the present invention provides a device used to retain a metal coil on a support surface that stabilizes the metal coil, reduces tensile force on the lines holding the metal coil to the surface, and prevents damage to the metal coil.

In an embodiment, the present invention provides a coil retainer for securing a metal coil to a support surface using one or more tension lines. The coil retainer includes a core insert extending about an arc and including first and second axial sides. The core insert is configured to be inserted into a hollow core of the metal coil so that an exterior of the core insert supports an inner annular surface of the metal coil along a portion of a circumference of the inner annular surface, so that the first axial side is disposed at an open end of the hollow core, and so that the second axial side is disposed within the hollow core. A coil side containment wall is attached to the first axial side of the core insert, extending along the arc of the core insert and projecting radially outward from the core insert. The coil side containment wall is configured to support a flat side of the metal coil. A cross beam extends across the arc of the core insert from a first section to a second section. At least one chain guide is attached to the cross beam and configured to guide a tension line over the cross beam at a height above a bottom of the inner annular surface of the metal coil. At least one chain mount is attached to the cross beam and configured to secure a tension line to the coil retainer.

In another embodiment, the present invention provides a method for securing a metal coil to a support surface using the coil retainer and one or more tension lines. The method includes providing first and second coil retainers and inserting each of the first and second coil retainers into the metal coil at a respective end of the metal coil so as to position the respective coil retainer into a hollow core of the metal coil. With each coil retainer inserted, an exterior of the respective core insert supports an inner annular surface of the metal coil along a portion of a circumference of the inner annular surface. The core inserts are inserted so as to position a first side of the respective core insert at an opening of the hollow core of the respective end of the metal coil and to position a second side of the respective core insert inside the hollow core. The coil side containment wall of each of the first and second coil retainers is positioned so as to support a flat side surface of a respective end of the metal coil. A first tension line is attached to the chain mount of the first coil retainer and guided over the cross beam of the second coil retainer using the chain guide of the second coil retainer. A second tension line is attached to the chain mount of the second coil retainer and guided over the cross beam of the first coil retainer using the chain guide of the first coil retainer. The first and second tension lines are secured to respective mounts associated with the support surface so as to secure the metal coil on the support surface.

BRIEF DESCRIPTION OF THE DRAWINGS

Exemplary embodiments of the present invention are described in more detail below with reference to the drawings, in which.

DETAILED DESCRIPTION

Figure 1:
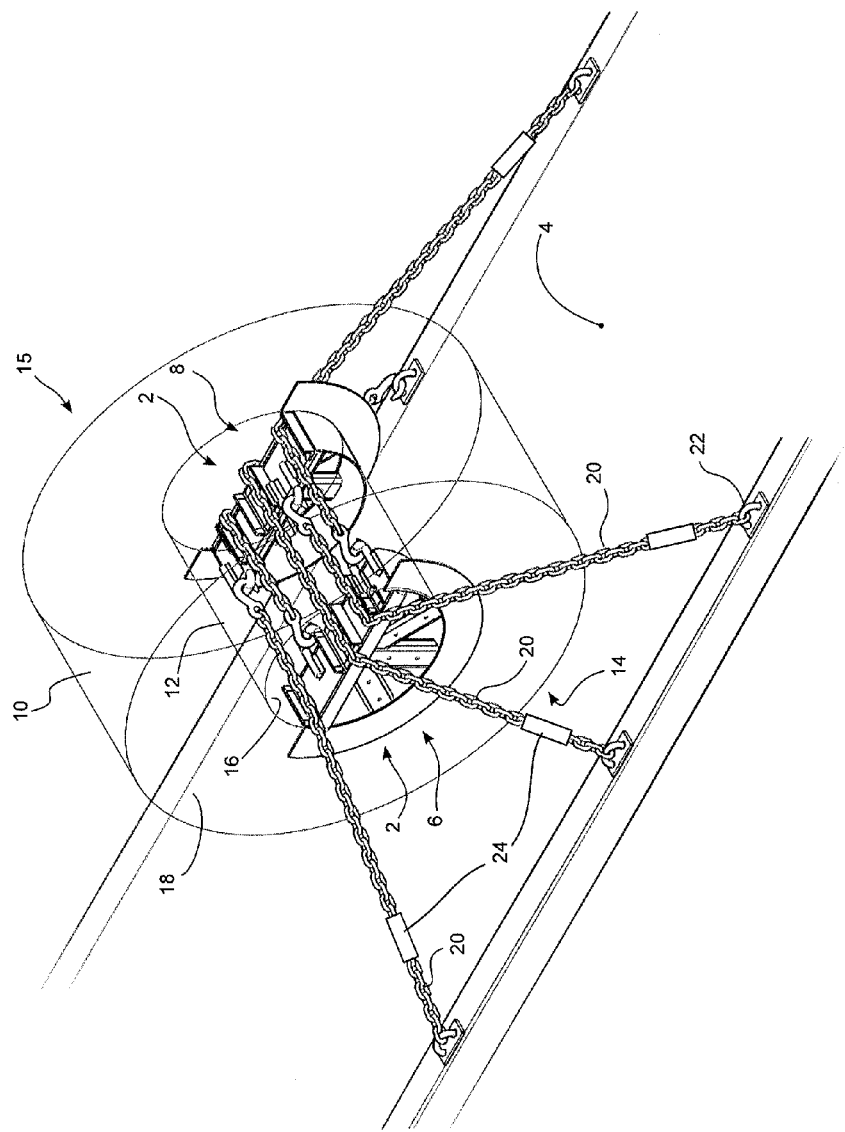
FIG. 1 shows a perspective view of an assembly of a pair of coil retainers in use with a metal coil.
Figure 2:
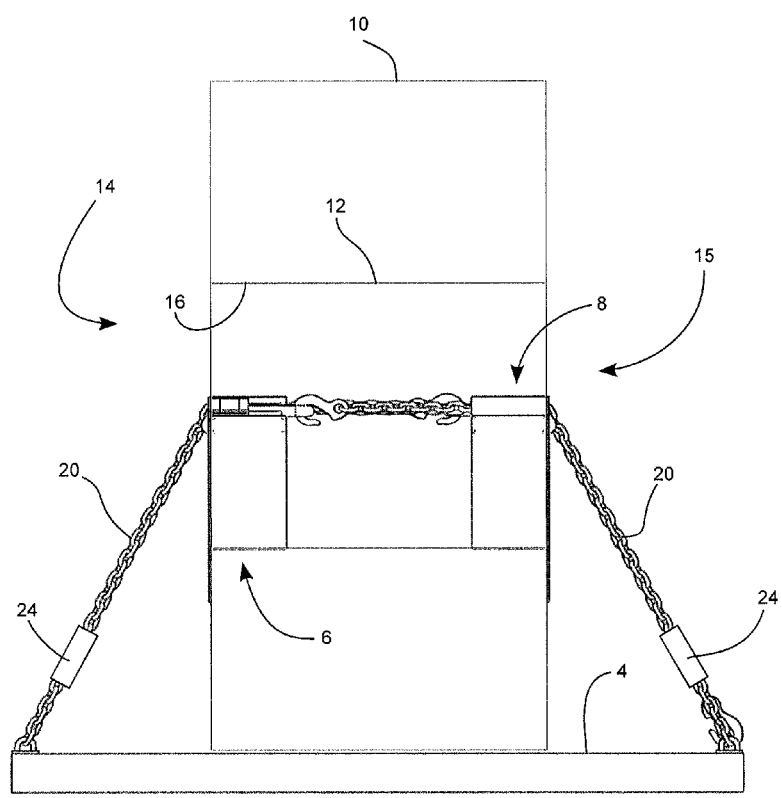
FIG. 2 shows the assembly of FIG. 1.

FIGS. 1 and 2 show a pair of coil retainers 2 securing a metal coil 10 on a surface 4. The pair of coil retainers includes a first coil retainer 6 and a second coil retainer 8, which are respectively inserted into the open hollow core 12 of the metal coil 10 at opposing first and second ends 14, 15 of the metal coil 10. Tension lines 20 are secured to the coil retainers 2 and are attached to mounts 22 associated with the surface 4 on which the metal coil 10 is secured. The combination of two coil retainers 2 inserted into the ends of the metal coil core 12 and the tension lines 20 securing the metal coil 10 to the surface 4 using the retainers 2 provides a containment of the coil 10 against rolling, tipping or moving relative to the surface 4 that is far superior to using tension lines alone.

Each of the coil retainers 2 includes a core insert 30 that is configured to be inserted into the hollow core 12 of the coil 10 so as to support an inner annular surface 16 of the metal coil 10 that surrounds the hollow core 12. In use, each core inserts 30 is positioned so that a majority thereof is positioned within the hollow core 12 with a first axial side of the core insert 30 being disposed at an open end of the hollow core 12. Extending radially outward from the first axial side of the core insert 30 is a coil side containment wall 40 that is configured to support the flat side 18 of the metal coil 10 at a respective end thereof. The core insert 30 and coil side containment wall 40 of each coil retainer 2 extends about an arc so as to follow the curve of the metal coil 10.

Each of the coil retainers 2 includes a cross beam 50 extending across the arc from a first section of the core insert to a second section of the core insert. The tension lines 20 extend over the cross beam 50 to hold the metal coil 10 in place. As a result, the tension lines 20 are guided over the coil retainers 2 at a height significantly above the lower portion of the hollow core. As explained in more detail below, by raising the location where the tension lines 20 pass over the coil retainer, the angle between the tension line 20 and the support surface 4 is steeper, which reduces the amount of tension in the tension line 20 when forces that are parallel to the surface 4 tend to move the metal coil 10. Accordingly, failure of the tension line 20 is reduced. The position of the tension lines 20 where they pass over the cross beam 50 is dictated by chain guides 70 that hold the tension lines 20 in place above the cross beam 50.

Figure 3:
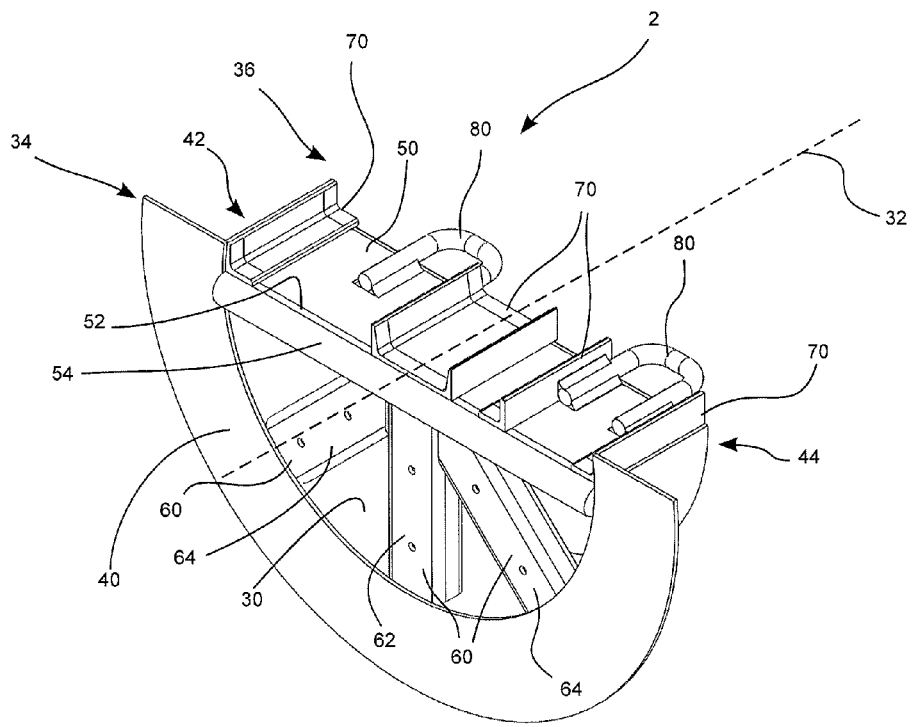
FIG. 3 shows a front perspective view of a coil retainer.
Figure 4:
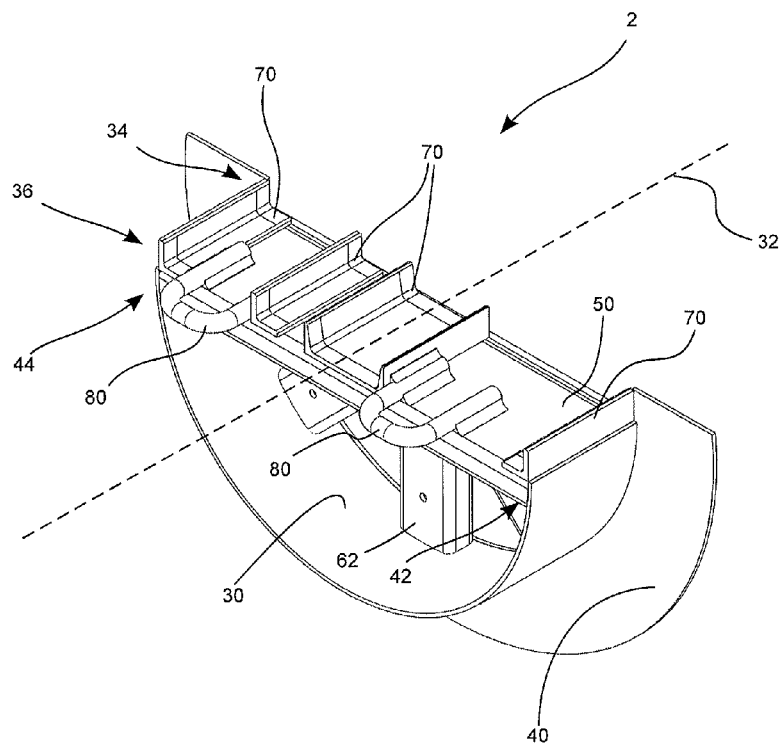
FIG. 4 shows a rear perspective view of the coil retainer of FIG. 3.

At least some of the tension lines 20 pass through the hollow core of the metal coil 10 to the opposite end of the coil where they are attached to the opposing coil retainer 2. In the illustrated embodiment, all tension lines 20 are shown passing through the core 12, but it is contemplated that fewer than all lines may be thus placed. To secure the tension lines 20 to the coil retainer, one or more chain mounts 80 is disposed on the cross beam 50 so that a corresponding tension line 20 can be connected thereto. Because the tension lines 20 are fixed to the support surface 4 at one end of the coil 10 and are fixedly attach to a coil retainer 2 at the opposite end of the coil 10, tightening of the tension lines 20 tends to pull the coil retainer 2 further in to the hollow core 12 of the coil 10. This configuration helps hold the coil retainers 2 in the metal coil 10 securely, so that the metal coil 10 is safely held on the support surface 4. In particular, because each coil retainer 2 is pulled by the tension lines 20 from an opposite end of the coil 10, the side containment wall 40 of each coil retainer 2 provides an axial force on the corresponding flat side of the coil. The resulting axial forces on each end of the coil yield a much more stable construction, and particularly aid in preventing the coils from tipping, since an axial force is exerted on each side of the coil FIGS. 3 and 4 show perspective front and rear views of a single coil retainer 2. Typically, the overall size of the coil retainer 2 will be dictated by the size of the core insert 30, which is appropriately sized for insertion into the hollow core of a corresponding metal coil. The core insert is configured to hold the coil in place by supporting the coil along the inner annular surface of the hollow core of the coil. Accordingly, the core insert 30 extends along an arc following the circumference of the inner surface of the coil and having an axis 32 that will coincide with the axis of the coil when the coil retainer is inserted into the coil. In order for the core insert 30 to fit within the hollow core, the outer radius of the arc of the core insert 30 is slightly smaller than the radius of the inner surface of the metal coil. This difference may be larger or smaller depending on how the core insert 30 interacts with the inner surface of the coil. In some embodiments the core insert 30 can be configured to support the coil by abutting the inner surface of the coil directly, in which case the difference between the outer radius of the arc of the core insert and the radius of the inner surface of the coil may be only small fractions of an inch. It is also possible for the core insert 30 to support the coil indirectly and for the assembly to include an intermediate member between the core insert 30 and coil, such as a padding or protective cloth. In such a case, the difference between the outer radius of the core insert 30 and the radius of the inner surface of the coil may be larger in order to accommodate the cushioning material therebetween. The standard inside diameter of a metal coil is 30", and thus, a typical coil retainer may have a core insert with an outside diameter that is slightly smaller, for example 28.5", as illustrated. However, as set forth above, the gap between the core insert and inside diameter of the metal coil may be smaller or larger. Moreover, the coil retainer can be configured for use with coils having inside diameters that are larger or smaller, such as 20" or 15", which are also available. In such a case, the outer diameter of the core insert 30 can be sized appropriately at slightly smaller than 20" and 15", respectively.

The length of the arc of the core insert 30 shown in the drawings is about 180 degrees. However, the core insert 30 can extend around a smaller or larger portion of the circumference of the inner surface of the coil, including the entire circumference of the coil, as desired. For example, the core insert 30 can extend in an arc from 120° to 270° about the circumference of the inner surface of the coil. Other arc lengths are also possible. The core insert 30 also has a width in the axial direction that defines a first axial side 34 and a second axial side 36. As described herein, the first axial side 34 of the core insert is configured to be positioned at the opening of the hollow core of the metal coil, while the second axial side 36 is configured to lie within the hollow core toward the center of the metal coil.

In the illustrated embodiment, the core insert 30 is formed by a single plate that is curved along the arc to form a surface that matches the inner diameter of the coil. However, it is also possible for the core insert 30 to be formed in separate sections of plate or, alternatively, to be formed by portions of other components. For example, the core insert 30 may simply be formed by then ends of the cross beam 50 and supports 92, 94, described below. The illustrated plate that serves as the core insert 30 is ¼" thick steel. Other appropriate sizes for the plate forming the core insert include 3⁄16" to ½" plate. The core insert may also be a section of pipe having the desired outer diameter.

Extending radially outward from the first axial side 34 of the core insert 30 is the coil side containment wall 40. Once the coil retainer 2 is inserted into the hollow core of the metal coil, the core insert may be advanced into the core until the containment wall 40 abuts the flat side surface of the metal coil. Thus, the containment wall 40 serves to secure the axial position of the coil retainer 2. Further, when in use, tension lines can be used to pull the coil retainer 2 toward the opposite end of the metal coil, thereby pulling the coil side containment wall 40 against coil side. This force on the coil retainer 2 assures that it holds firmly within the metal coil.

In the illustrated embodiment, the inner radius of the coil side containment wall 40 is 14" such that it is flush with the inside surface of the core insert 30. Alternatively, the coil side containment wall 40 may extend radially inward from core insert. However, such an inward extension would not provide a force acting on the side of the coil. In contrast, the radial outward extension of the coil side containment wall 40 extends beyond the outer surface of the core insert 30 and beyond the inner surface of the corresponding coil, so that it can provide a force against the side of the metal coil around the hollow core. In the illustrated embodiment, the coil side containment wall has an outer radius of 20" so that it will extend 5" from the inner surface of a 30" diameter core. Other possible sizes for the radial extension of the coil side containment wall include dimensions that will prove an extension of 2" to 8" from the inner surface of the coil.

The circumferential extension of the coil side containment wall 40 follows the arc of the core insert 30 and may have a similar angular extension as the core insert 30. In FIGS. 1-4, the coil side containment wall 40 extends 1" further around the circumference of the arc at each end of the core insert 30. As a result, the upper edge of the coil side containment wall 40 is flush with the upper edge of chain guides 60, described below, at each end of the arc. Alternatively, the coil side containment wall 40 may have a smaller angular extension around the arc than the core insert 30.

Similar to the core insert 30, the illustrated coil side containment wall 40 is also made of a single piece of ¼" steel plate. However, the coil side containment wall 40 may also be formed by several flanges extending out from the core insert 30 at different locations around the arc. Further, other thicknesses for the coil side containment wall 40 are also possible, for example ³⁄₁₆" to ½" thick plate.

A cross beam 50 extends across the arc from a first section 42 of the core insert 30 to a second section 44 of the core insert 30. Thus, the cross beam 50 forms a geometric cord with respect to the arc formed by the core insert 30. In the illustrated embodiment, the first and second sections 42, 44 of the core insert 30 are at opposing ends of the arc, which, as set forth above is about 180°, so that the cross beam 50 forms a geometric diameter of the arc. Alternatively, the cross beam 50 may extend across a smaller angle of the core insert 30 at a lower position within the hollow core. In such a case, the ends of the core insert 30 may extend further than the cross beam, around a larger angle than the cord formed by the cross beam 50, or the core insert 30 could itself extend around a smaller angle. Likewise, if the arc of the core insert 30 has an angular extension greater than 180°, the first and second sections 42, 44 may be higher so that the cross beam 50 is positioned above the center of the hollow core.

A first axial side 52 of the cross beam 50 can include a chain round 54 that provides a rounded surface on which the tension line rests. The chain round 54 is advantageous because it prevents the tension line, from catching on an edge of the cross beam 50. This is particularly the case when the tension line is a chain formed by links that may be susceptible to catching on a sharp corner. The chain round 54 can be formed as a separate element on the first axial side of the body of the cross beam 50, or it can be formed integrally with the rest of the cross beam 50 as a rounded edge of the cross beam. As an example, the chain round 54 may be formed by 1" diameter round stock. Alternatively the chain round 54 may have other dimensions, such as ½" or 1½" round stock, or other constructions, such as a round tube or pipe. The length of the chain round 54 can be selected to extend across the entire first axial side 52 of the cross beam 50, or it can be formed in sections at selected locations along the first axial side.

The cross beam 50 shown in FIGS. 3 and 4 is constructed of 2"×8" rectangular steel tube with ¼" thick walls. However, the cross beam 50 may have any of a large variety of other sizes, including tubes from 1"×3" up to 4"×10". Further, the cross beam 50 may also be provided by one or more rounded tubes, or other structural members, such as channels, angles or beams.

The cross beam 50 may be structurally supported by one or more supports 60 extending from the core insert to a surface of the cross beam 50. The embodiment of FIGS. 3 and 4 includes a central vertical support 62 extending from a central section of the arc of the core insert 30 to the center of the cross beam 50. Two angled supports 64 are also disposed on each side of the vertical support 62 and extend from an intermediate section on the core insert 30 toward the center of the cross beam 50. The angled supports 64 join the cross beam 50 at a junction where the vertical support 62 meets the cross beam 50 such that each angled support 64 intersects both the vertical support 62 and the cross beam 50. The illustrated supports 60 are formed by 2"×4" rectangular steel tubes having walls that are ¼" thick. However, other dimensions are also possible, for example, tubes from 1"×3" to 4"×6". Further, the vertical support 62 may be larger than the angled supports 64, for example, having a range up to 4"×10". The supports 60 can also be formed of other structural elements, such as channels, angles or beams.

When the coil retainers 2 are used to secure the metal coil on a support surface, tension lines are guided over the cross beam 50 and held in place by chain guides 70. The chain guides 70 extend up from the cross beam 50 to provide an abutment for the tension lines so that they are prevented from moving along the length of the cross beam 50. The coil retainer illustrated in FIGS. 3 and 4 is configured for use with a plurality of tension lines and includes several different chain guides. At the center of the cross beam 50 is a central chain guide 72 configured to hold a tension line passing over the center of the cross beam 50. On each side of the central chain guide 72 are side chain guides 74, 76, which are described in further detail below.

The chain guides 70 can have a plurality of different structures, as their basic function is merely to limit lateral movement of the tension lines along the cross beam 50. Thus, any structure that extends up from the cross beam 50 to provide an abutment for limiting chain movement can be sufficient for use as a chain guide 70, including bars, plates, channels, angles, pipes or merely posts that extend up from the top surface of the cross beam 50. In one embodiment, the central chain guide 72 may include two abutments for limiting movement of the tension lines in both directions along the cross beam 50. Since the tension lines held against the side chain guides 74, 76 are typically pulled taught in one direction, it is possible to include the abutment on only one side, as it is unlikely that the tension line will move away from the chain guide. In the illustrated embodiment, the central chain guide 72 is formed by a 4" channel, with the flanges of the channel forming two abutments. The central chain guide 72 is configured to hold the tension line within the channel, above the web. In other embodiments, the channel may be 2" to 6" or other sizes. The side chain guides 72, 74 shown in FIGS. 3 and 4 are constructed of 2"×2" angles, with one leg of the angle attached to the cross beam 50, and the second leg extending up from the upper surface of the cross beam. The second leg of the angle provides the abutment for holding the tension line in place. Other appropriate sizes for the side chain guides include angles of 1"×1" or 3"×3". However, as set forth above, a wide variety of different structures can be used for either of the chain guides, including angles of additional different sizes.

Chain mounts 80 are also disposed on the cross beam 50 and configured to attach one or more tension lines to the coil retainer 2. In use, the tension lines are guided over the coil retainer at one end of the metal coil and attach to a coil retainer at the opposite end of the metal coil. Each tension line can be attached to a respective chain mount 80 directly using an attachment device, such as a hook, as shown in FIGS. 1 and 2. Alternatively, the tension line 20 can extend through the chain mount 80 and be looped back to attach to itself and form a secure loop secured to the chain mount 80. As explained above, when the tension lines are tightened, the resulting force pulls the coil retainer inward toward the center of the metal coil. Therefore, the chain mounts 80 can be conveniently positioned on the inner side of the coil retainer. In the illustrated embodiment, the chain mounts 80 extend out from the second axial side 56 of the cross beam 50 so as to extend toward the opposite end of the coil and the corresponding opposing coil retainer. The chain mounts 80 used in the illustrated configuration are 1" steel bar that is bent into a "U" that is 7" wide and 5" long. Of course, other size bar, such as ¾" to 1½" steel bar, and other "U" shaped dimensions may also be used. In the illustrated embodiment, the "U" shaped configuration is laid flat against the top of the cross beam 50 with the closed end extending out from the second axial side 56 of the cross beam 50. In other configurations, the chain mounts 80 can be attached to the side of the cross beam 50 or extend up from the top surface of the cross beam. In addition, the chain mounts 80 may be removably coupled to the cross beam 50 or another part of the retainer coil. For example, the "U" shaped mount may be configured to hook over the cross beam 50. The chain mount 80 can also be constructed of other materials, such as a section of pipe, an eye bolt, or a hook. In addition, the chain mount 80 can be integrated into the cross beam 50, or mounted to or integrated in any other part of the coil retainer 2.

The chain guides 70 and chain mounts 80 are asymmetrically arranged on the cross beam 50. This arrangement prevents the opposing tension lines from crossing as they extend through the metal coil. In particular, in the illustrated embodiment, the side chain guides include an outer side chain guide 74 and an inner side chain guide 76. The outer side chain guide 74 is disposed at the end of the cross beam 50 and the inner side chain guide 76 is disposed further inward between the end of the cross beam 50 and the axis 32 of the core insert 30. The chain mounts 80 are also asymmetrically configured and include an inner chain mount 82 and an outer chain mount 84. Both chain mounts 82, 84 are positioned between the end of the cross beam and the axis 32 of the core insert. However, the inner chain mount 82 is further toward the axis 32 than the outer chain mount 84. The inner chain mount 82 is positioned on the same side of the coil retainer 2 as the outer chain guide 74, while the outer chain mount 84 is on the side of the coil retainer 2 where the inner chain guide 76 is disposed. As a result, when two coil retainers are inserted into opposite ends of a coil, with one coil retainer disposed at 180° from the opposing coil retainer, the inner guides are aligned with the inner mounts and the outer guides are aligned with the outer mounts. Accordingly, two of the tension lines will extend from the respective outer guides 74 to the respective outer chain mounts 84, and two of the tension lines will extend from the respective inner guides 76 to the respective inner chain mounts 82, as illustrated in FIG. 1. Thus, crossing of the tension lines, which may be legally prohibited, is prevented. The central tension lines can also be prevented from crossing by each extending from the central chain guide 72 at one end of the coil to the inner chain mount 82 at the opposite end of the coil.

While the illustrated configuration includes chain guides and chain mounts that are both asymmetrically arranged, the prevention of crossed tension lines may also be achieved with only one of either the chain mounts or the chain guides being asymmetrically positioned. Thus, the asymmetric configuration can be achieved so long as at least one of the chain guides and chain mounts are asymmetrically configured on the cross beam.

The coil retainers can be formed from a variety of different materials in a number of different ways. In an exemplary embodiment, the coil retainers are formed from structural pieces of SAE 1020 steel that are welded together. Other materials may also be suitable for fabricating the coil retainers, such as other steel alloys, including stainless steel, other high strength alloys, aluminum alloys, high strength plastics, reinforced materials, including reinforced plastics, or a composite of different materials selected for the different elements of the coil retainer based on its respective function. The coil retainers can also be fabricated by another method, such as casting.

In an embodiment, the present invention also provides a method of securing a metal coil to a support surface. An exemplary embodiment is described in the following with respect to FIGS. 1 and 2, with reference to the particular components of the coil retainers, as shown in FIGS. 3 and 4. In FIGS. 1 and 2 a metal coil 10 is shown resting on a support surface 4. Common metal coils are often steel coils, but the metal coil 10 may be formed of another material, such as aluminum or other alloys. The support surface 4 may, for example, be part of a vehicle. In the illustrated embodiment, the support surface 4 represents a truck bed of a truck for transporting the metal coil 10. In accordance with typical truck beds, the support surface 4, in this case, is 96" wide. The metal coil 10 is centered with respect to the width of the truck bed 4 and lies on its curved outer surface. The axis of the coil runs perpendicular to the length of the truck bed so that tension lines 20 can extend through the hollow core 12 and be attached at respective sides of the truck bed 4 to mounts 22. The surface 4 may additionally include recesses into which a portion of the coil may rest.

With the metal coil 10 in place on the support surface 4, two coil retainers 2 are inserted into the ends of the hollow core 12. Specifically, a first coil retainer 6 is inserted into a first end 14 of the metal coil 10 and a second coil retainer 8 is inserted into a second end 16 of the metal coil 10. Each coil retainer 2 is positioned so that the respective core insert 30 is inserted into the hollow core 12 of the metal coil and so that the core insert 30 supports the inner annular surface 16 of the metal coil 10. The support provided by the core insert 30 can be direct, with the core insert 30 directly abutting the inner surface 16 of the coil 10, or it can be indirect and include a protective element or padding that is insertable between the core insert 30 and the coil 10. The coil retainers 2 are inserted to an appropriate depth so that the coil side containment wall 40 is adjacent to the flat side 18 of the coil 10 and supports the coil. Again, the support provided by the containment wall 40 can be direct, with the containment wall contacting the side 18 of the coil, or it can be indirect, with a protective or padding element disposed therebetween.

Tension lines 20 are then used to secure the metal coil 10 to the support surface 4 using the coil retainers 2. The tension lines 20 can be formed by any flexible line that can be guided through the metal coil 10 and bear some tensile load. For example, the tension lines 20 may be formed by chains, which are typically used in this field. Other tension lines can also be suitable for this application including cord, rope, straps or any other flexible material that can be constructed with sufficient strength to bear the necessary load. Further, while the elements that cooperate with the tension lines are described herein as chain guides and chain mounts, it should be understood that this description does not limit the type of tension line used with these elements, and that any suitable tension line may be used.

In the illustrated embodiment, a total of five tension lines 20 are used to secure the metal coil to the support surface. Two tension lines are secured to mounts 22 on the support surface 4 at the first end 14 of the coil 10 and are guided over the first coil retainer 6 toward the second end 16 of the coil, where they are attached to the second coil retainer 8. Likewise, another two tension lines are secured to mounts 22 at the second end 16 of the coil 10 and are guided over the second coil retainer 8 toward the first end 14 of the coil, where they are attached to the first coil retainer 6. A central tension line is secured to mounts on both ends of the coil and is guided over both coil retainers 6 and 8.

As described above, the chain guides 70 and chain mounts 80 are asymmetrically arranged on each coil retainer 6, 8, so that the tension lines 20 do not cross as they pass through the hollow core of the coil. Specifically, one of the tension lines from each end of the coil extends from an outer chain guide 74 to an outer chain mount 84. Thus, these outer tension lines lie furthest from the central axis of the coil. Inside of these tension lines lie the inner tension lines, which extend in an opposite direction to the adjacent outer tension lines, and extend from the inner chain guide 76 to the opposing inner chain mount 82. Toward the center of the hollow core lies a central tension line, which is guided by the central chain guide 72 of each coil retainer and extends from a mount 22 on the support surface 4 at one end of the coil, through the coil to a mount 22 on the support surface at the other end of the coil. Alternatively, two central tension lines could be used, each attaching to a mount 22 on the support surface 4 at an end of the coil 10 and being attached to the inner chain mount 82 at an opposite end of the coil 10. In this configuration, so long as the inner tension line and central tension line on each side are attached in the correct position on the inner chain mount 82, none of the tension lines need cross.

Once the tension lines 20 are in place, each can be tightened using a chain tensioner 24 or turnbuckle. As the tension lines 20 are pulled taught, the tightening force will pull the corresponding coil retainer 2 toward the center of the coil so that the coil side containment walls 40 press against the side 18 of the coil. Thus, the tightened tension lines not only hold the coil firmly against the support surface 4, they also securely fix the axial position of the coil on the surface 4.

From the top of the cross beam 50, the tension lines 20 extend at an angle down to the mounts 22 positioned on the support surface. The gradient of this angle partially determines the amount of tensile force that is exerted on the tension line, with a steeper angle being subjected to a lower tensile force. Thus, by having the tension lines 20 pass over the top of the cross beams 50, rather than the lower edge of the inside diameter of the coil, the angle between the tension line 20 and the support surface 4 is increased. This increased angle results in a reduced tensile force on the tension line. A calculation of the reduction of the tensile force on the corresponding tension line due to the increased height of the tension line extending over the cross beam 50 in comparison to a tension line extending over the lower edge of the coil itself is illustrated in Table 1 below. Table 1 includes the percentage of reduction in tensile force on the tension line for coils of various height and width, where a truck bed width of 96" and an inside coil diameter of 30" is assumed. As demonstrated by Table 1, for the standard coil widths ranging from 46" to 54" and standard coil heights of 60" to 74", the percentage of reduction in tensile force of the tension line is from 20% up to about 50%.

TABLE 1

| Reduction in Tensile Force Due to Coil Retainer | | | | | | | | | | | | | | | |
|---|---|---|---|---|---|---|---|---|---|---|---|---|---|---|---|
| | | | Edge of Bed to Coil | | | | | | | | | | | | |
| | | | 27 | 26 | 25 | 24 | 23 | 22 | 21 | 20 | 19 | 18 | 17 | 16 | 15 |
| | | | | | | | | | Coil Width | | | | | | |
| Center | Coil Edge | Height | 42 | 44 | 46 | 48 | 50 | 52 | 54 | 56 | 58 | 60 | 62 | 64 | 66 |
| 40 | 25 | 80 | 22% | 21% | 20% | 19% | 18% | 17% | 16% | 15% | 13% | 12% | 11% | 10% | 9% |
| 39 | 24 | 78 | 24% | 23% | 22% | 20% | 19% | 18% | 17% | 16% | 15% | 13% | 12% | 11% | 10% |
| 38 | 23 | 76 | 26% | 25% | 23% | 22% | 21% | 20% | 19% | 17% | 16% | 15% | 14% | 12% | 11% |
| 37 | 22 | 74 | 28% | 27% | 25% | 24% | 23% | 22% | 20% | 19% | 18% | 16% | 15% | 13% | 12% |
| 36 | 21 | 72 | 30% | 29% | 28% | 26% | 25% | 24% | 22% | 21% | 19% | 18% | 16% | 15% | 13% |
| 35 | 20 | 70 | 33% | 32% | 30% | 29% | 27% | 26% | 24% | 23% | 21% | 20% | 18% | 16% | 15% |
| 34 | 19 | 68 | 36% | 35% | 33% | 32% | 30% | 28% | 27% | 25% | 23% | 22% | 20% | 18% | 17% |
| 33 | 18 | 66 | 40% | 38% | 36% | 35% | 33% | 31% | 30% | 28% | 26% | 24% | 22% | 20% | 19% |
| 32 | 17 | 64 | 43% | 42% | 40% | 38% | 37% | 35% | 33% | 31% | 29% | 27% | 25% | 23% | 21% |
| 31 | 16 | 62 | 48% | 46% | 44% | 43% | 41% | 39% | 37% | 35% | 32% | 30% | 28% | 26% | 23% |
| 30 | 15 | 60 | 53% | 51% | 49% | 47% | 45% | 43% | 41% | 39% | 36% | 34% | 31% | 29% | 26% |
| 29 | 14 | 58 | 59% | 57% | 55% | 53% | 51% | 48% | 46% | 44% | 41% | 38% | 36% | 33% | 30% |
| 28 | 13 | 56 | 66% | 64% | 62% | 59% | 57% | 55% | 52% | 49% | 47% | 44% | 41% | 38% | 35% |
| 27 | 12 | 54 | 74% | 72% | 70% | 67% | 65% | 62% | 59% | 56% | 53% | 50% | 47% | 43% | 40% |
| 26 | 11 | 52 | 84% | 81% | 79% | 76% | 74% | 71% | 68% | 64% | 61% | 58% | 54% | 50% | 46% |
| 25 | 10 | 50 | 96% | 93% | 90% | 88% | 85% | 81% | 78% | 75% | 71% | 67% | 63% | 59% | 55% |

Although each of the tension lines 20 is described as being attached with respect to the support surface 4 at one end and attached to a coil retainer 2 at an opposite end, it should be understood that a tension line may extend through the coil and connect at both ends to the support surface. For example, the inner and outer tension lines may be attached to respective chain mounts of the coil retainer, while a single central tension line may be guided over both central chain guides 72 without being directly attached to either coil retainer 2. Further, while the above method is described in a particular order, it should be understood that the method is not limited to this particular order, and may be changed where appropriate. For example, the tension lines may be fixed to the coil retainers before the coil retainers are positioned within the hollow core of the coil. Likewise, the coil retainers 2 may be disposed in the coil before the coil is placed on the support surface 4. Other modifications are also possible.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A coil retainer useable in a pair of coil retainers for securing a metal coil having a generally hollow cylindrical shape to a support surface using one or more tension lines, the coil retainer comprising:
   a core insert extending about a semi-circular arc and including a first axial side and a second axial side, the core insert being configured to be inserted into a hollow core of the metal coil so that an exterior of the core insert supports an inner annular surface of the metal coil along a semi-circular portion of a circumference of the inner annular surface, so that the first axial side is disposed at an open end of the hollow core, and so that the second axial side is disposed within the hollow core;
   a coil side containment wall attached to the first axial side of the core insert, extending along the arc of the core insert and projecting radially outward from the core insert, the coil side containment wall being configured to support a flat side of the metal coil;
   a cross beam extending across a diameter of the arc from a first section of the core insert to a second section of the core insert, said diameter of the arc being configured to be generally parallel to the support surface;
   at least one chain guide attached to a center of the cross beam and configured to guide a tension line over the cross beam at a height substantially above a bottom of the inner annular surface of the metal coil and along a centerline of a coil cross section such that the tension line extends along a center of mass of the metal coil;
   an additional tension line and an additional coil insert;
   at least one chain mount attached to the cross beam and configured to secure said additional tension line to the coil retainer, the said additional tension line associated with said additional coil insert disposed on an opposite end of the metal coil such that the said additional tension line lines on a plane that includes the tension line and that is also parallel with the support surface;
   wherein the additional tension line engages a diametrical end of the core insert and the additional core insert to resist rolling forces of the metal coil with respect to the support surface during transport.

2. The coil retainer recited in claim 1, wherein the first section of the core insert is disposed at a first end of the arc and the second section of the core insert is disposed at a second end of the arc such that the cross beam is configured to extend across a width of the metal coil core.

3. The coil retainer recited in claim 1, wherein the exterior of the core insert is formed by at least one curved surface.

4. The coil retainer recited in claim 1, wherein the core insert includes a curved plate having an outer surface forming the exterior.

5. The coil retainer recited in claim 1, further comprising at least one support extending from the core insert to the cross beam.

6. The coil retainer recited in claim 5, wherein the at least one support includes a vertical support extending from a central section of the core insert arc to a center of the cross beam and an angled support extending from an intermediate section of the core insert are to the center of the cross beam.

7. The coil retainer recited in claim 1, wherein the coil side containment wall includes an arc-shaped plate forming adapted to abut the flat side of the metal coil.

8. The coil retainer recited in claim 1, wherein the at least one chain guide includes a central chain guide disposed at a center of the cross beam and two side chain guides disposed at opposite ends of the cross beam.

9. The coil retainer recited in claim 8, wherein the central chain guide includes a channel.

10. The coil retainer recited in claim 1, further comprising a chain round disposed on a first side of the cross beam and configured to provide a guiding surface for the tension line around the cross beam.

11. The coil retainer recited in claim 1, wherein the at least one chain guide includes a plurality of chain guides and the at least one chain mount includes a plurality of chain mounts, and wherein at least one of a configuration of the chain guides and a configuration of the chain mounts is asymmetrical.

12. The coil retainer recited in claim 1, further comprising an off-center chain guide attached to the cross beam and configured to accept therein a second additional tension line that is connected on one end to the corresponding chain mount of the additional coil insert, passes through the off-center chain, and is secured on a second end to a respective mount associated with the support surface.

13. A method of securing a cylindrical metal coil to a support surface using a pair of coil retainers, the method comprising:
   providing first and second coil retainers, each coil retainer comprising:
   a core insert extending about a semi-circular arc and including a first axial side and a second axial side, the core insert being insertable into a hollow core of the cylindrical metal coil,
   a coil side containment wall attached to the first axial side of the core insert, extending along the arc of the core insert and projecting radially outward from the core insert,
   a cross beam extending horizontally across the arc from a first section of the core insert to a second section of the core insert such that the cross beam traverses an inner diameter of the hollow core of the cylindrical metal coil, a center chain guide attached around a central location of the cross beam, an off-center chain guide attached at an off-center location of the cross beam, and a chain mount attached to the cross beam at a location between the chain guide and the first or second axial side of the core insert;

inserting each of the first and second coil retainers into the metal coil at a respective end of the metal coil so as to position the respective core insert into the hollow core of the metal coil with an exterior of the respective core insert supporting an inner annular surface of the metal coil along a portion of a circumference of the inner annular surface, to position the first side of the respective core insert at an opening of the hollow core of the respective end of the metal coil, and to position the second side of the respective core insert inside the hollow core;

positioning the respective coil side containment wall of each of the first and second coil retainers so as to support a flat side surface of a respective end of the metal coil;

positioning the respective cross beams such that they are parallel to one another and also parallel to the support surface;

attaching a first tension line to the chain mount of the first coil retainer;

guiding the first tension line over the cross beam of the second coil retainer using the off-center chain guide of the second coil retainer;

attaching a second tension line to the chain mount of the second coil retainer;

guiding the second tension line over the cross beam of the first coil retainer using the off-center chain guide of the first coil retainer;

attaching the first and second tension lines to respective mounts associated with the support surface attaching a third tension line to respective mounts associated with the support surface on both ends, and guiding the third tension line so it passes through the center chain guides of the first and second coil retainers and over a respective central portion of the respective cross beams such that the third tension line extends along a center of mass of the metal coil.

14. The method recited in claim 13, further comprising tightening the first and second tension lines so as to provide an axial force on each coil retainer tending to resist a rolling motion of the metal coil with respect to the support surface during transport.

15. The method recited in claim 14, wherein the arc of each core insert is about 180 degrees.

16. The method recited in claim 15, wherein the first section of the each core insert is disposed at a first end of the respective arc and the second section of each core insert is disposed at a second end of the respective arc such that the cross beam of each coil retainer is configured to extend across a width of the metal coil core.

17. The method recited in claim 13, wherein each coil retainer includes at least one support extending from the respective core insert to the respective cross beam.

18. The method recited in claim 17, wherein the at least one support includes a vertical support extending from a central section of the respective core insert arc to a center of the respective cross beam and an angled support extending from an intermediate section of the respective core insert arc to the center of the respective cross beam.

19. The method recited in claim 13 wherein each of the first and second coil retainers includes at least one additional chain guide and at least one additional chain mount, and wherein, for each coil retainer, at least one of a configuration of the chain guide and at least one additional chain guide and a configuration of the chain mount and at least one additional chain mount is asymmetrical so as to prevent the first, second and additional tension lines from crossing.

\* \* \* \* \*